Jan. 15, 1935.  A. PERON  1,988,087
BROILER
Filed Feb. 6, 1932  4 Sheets-Sheet 1
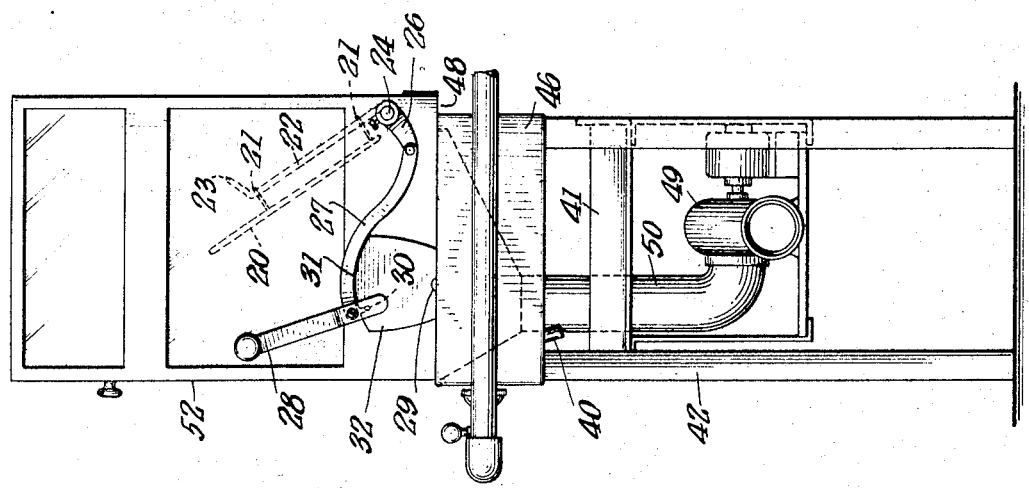
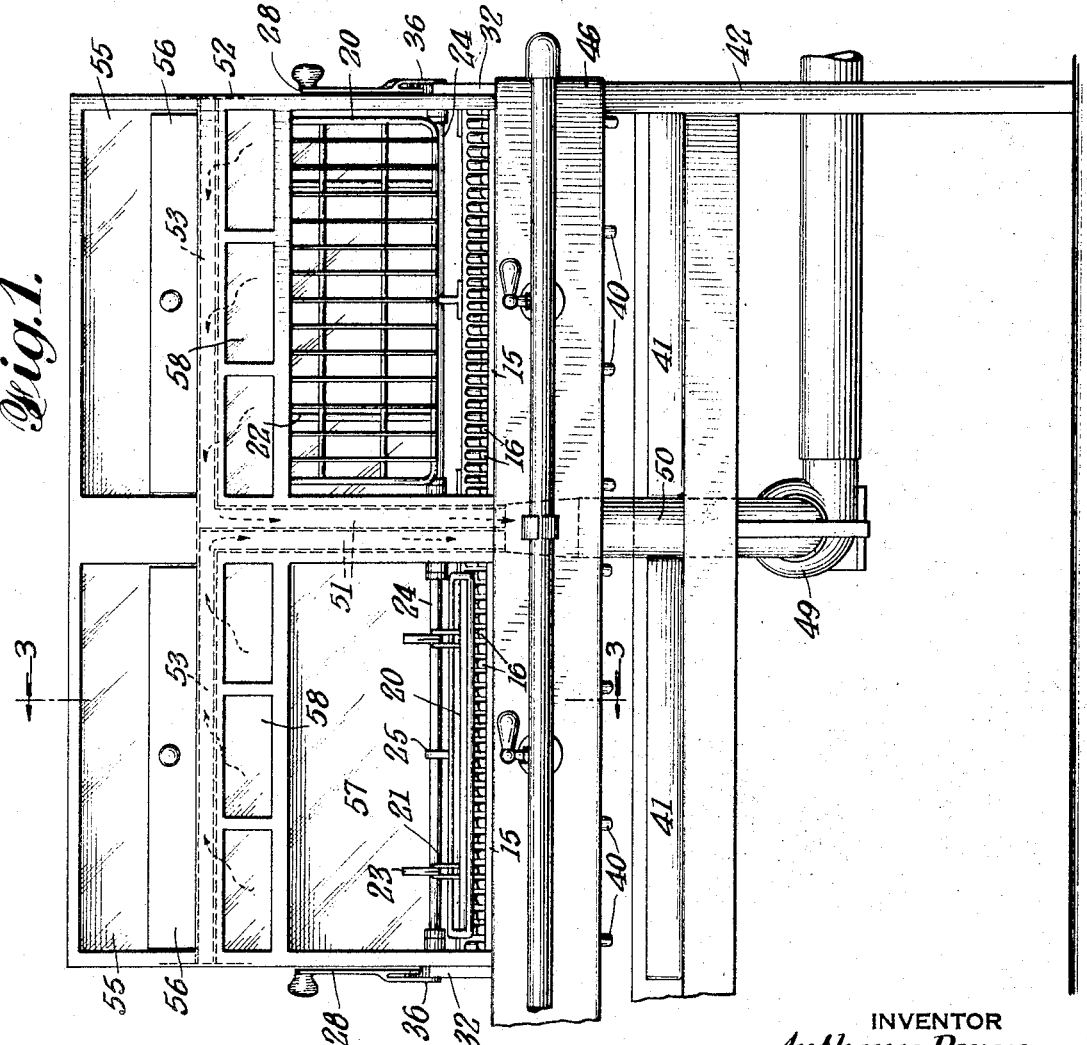
INVENTOR
*Anthony Peron*
BY
ATTORNEY Jan. 15, 1935.          A. PERON          1,988,087

BROILER

Filed Feb. 6, 1932      4 Sheets-Sheet 2

INVENTOR
Anthony Peron
BY
ATTORNEY

Jan. 15, 1935.  A. PERON  1,988,087
BROILER
Filed Feb. 6, 1932  4 Sheets-Sheet 3

INVENTOR
*Anthony Peron*
BY
ATTORNEY

Jan. 15, 1935.  A. PERON  1,988,087
BROILER
Filed Feb. 6, 1932   4 Sheets-Sheet 4

INVENTOR
*Anthony Peron*
BY
ATTORNEY

Patented Jan. 15, 1935

1,988,087

UNITED STATES PATENT OFFICE 1,988,087

BROILER

Anthony Peron, New York, N. Y.

Application February 6, 1932, Serial No. 591,301

6 Claims. (Cl. 126—41)

Special objects of the present invention are to provide apparatus for broiling meats and fish and for cooking and toasting purposes generally, which will preserve the flavor and good qualities of the food and, in the case of meats and fish will, while the broiling is in process, carry off the grease and impurities, without however driving off the natural and desirable juices or extracts; to protect the food from the contamination of carbon monoxide and other gases from the burner; to effect the cooking expeditiously and economically; and to provide apparatus for the purpose which will be relatively simple, inexpensive and entirely practical.

The foregoing and other desirable objects are attained by this invention through the novel features of construction, combinations and relations of parts, hereinafter described and broadly claimed.

The drawings accompanying and forming part of this specification, illustrate certain practical embodiments of the invention, but it is to be understood that the structure may be modified and changed as regards the present disclosure without departure from the true spirit and broad scope of the invention.

Fig. 1 is a broken elevation of a multiple unit type of broiler;

Fig. 2 is an end elevation of the same;

Figure 4:
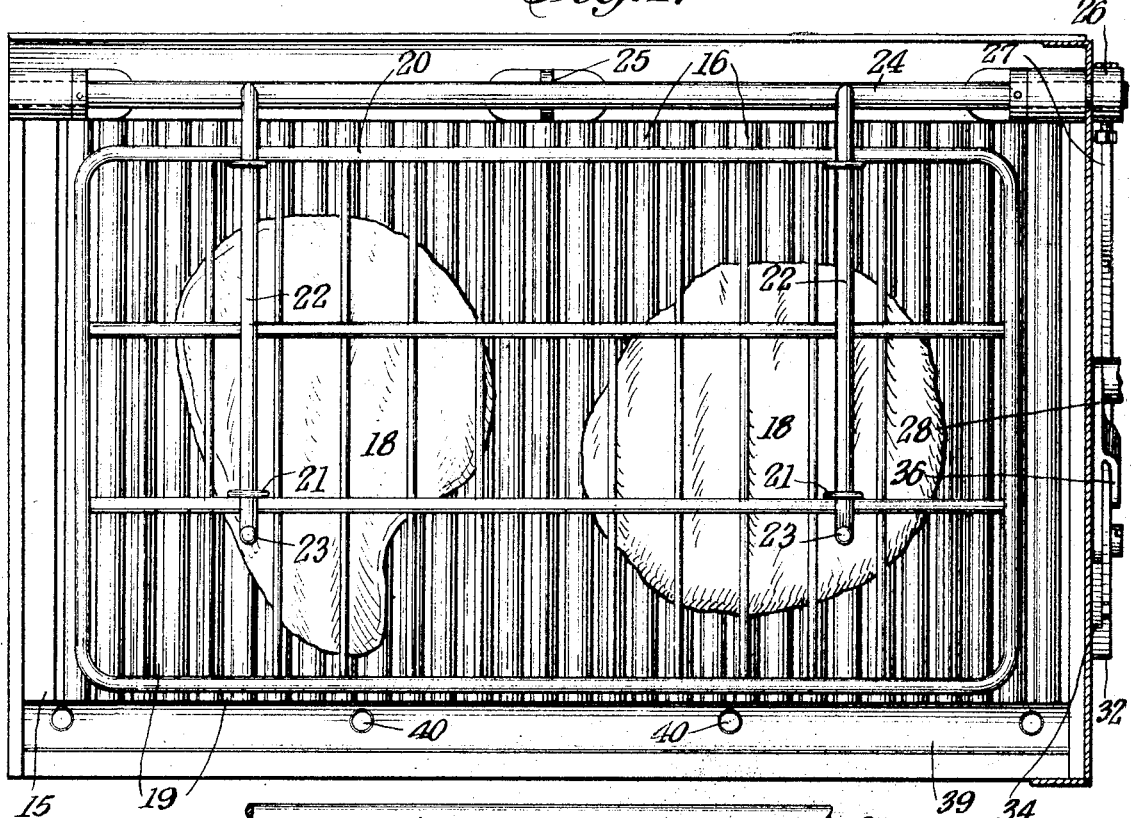
Fig. 4 is a broken horizontal sectional view as on substantially the plane of line 4—4 of Fig. 3.
Figure 5:
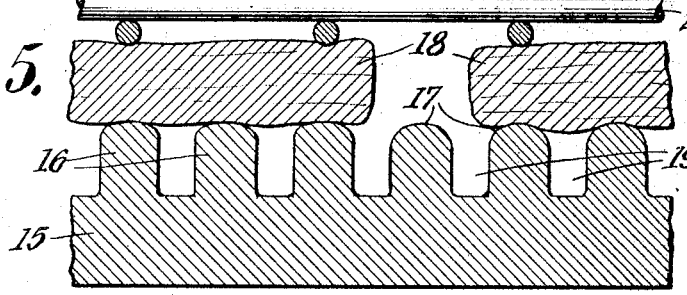
Fig. 5 is a broken sectional detail illustrating the ribbed structure of the broiler plate and the holding grille.

In all the several forms of the invention illustrated, the cooking is effected on a heated plate or panel 15 having relatively closed spaced ribs or ridges 16 having rounded upper surfaces 17 for supporting and directly transmitting the heat to the meat, fish or other food indicated at 18, Figs. 4 and 5, said broiling plate being imperforate throughout the ribbed cooking area to prevent monoxide and other injurious gases reaching the food and the separated ribs providing between them the grooves or channels 19 which are inclined to drain off the scum of grease and impurities.

Another important feature common to the several forms of the invention illustrated is a grille designated 20 and mounted so that it may hold the meat or the food in proper contact with the cooking ribs, without squeezing the juices therefrom.

Figure 3:
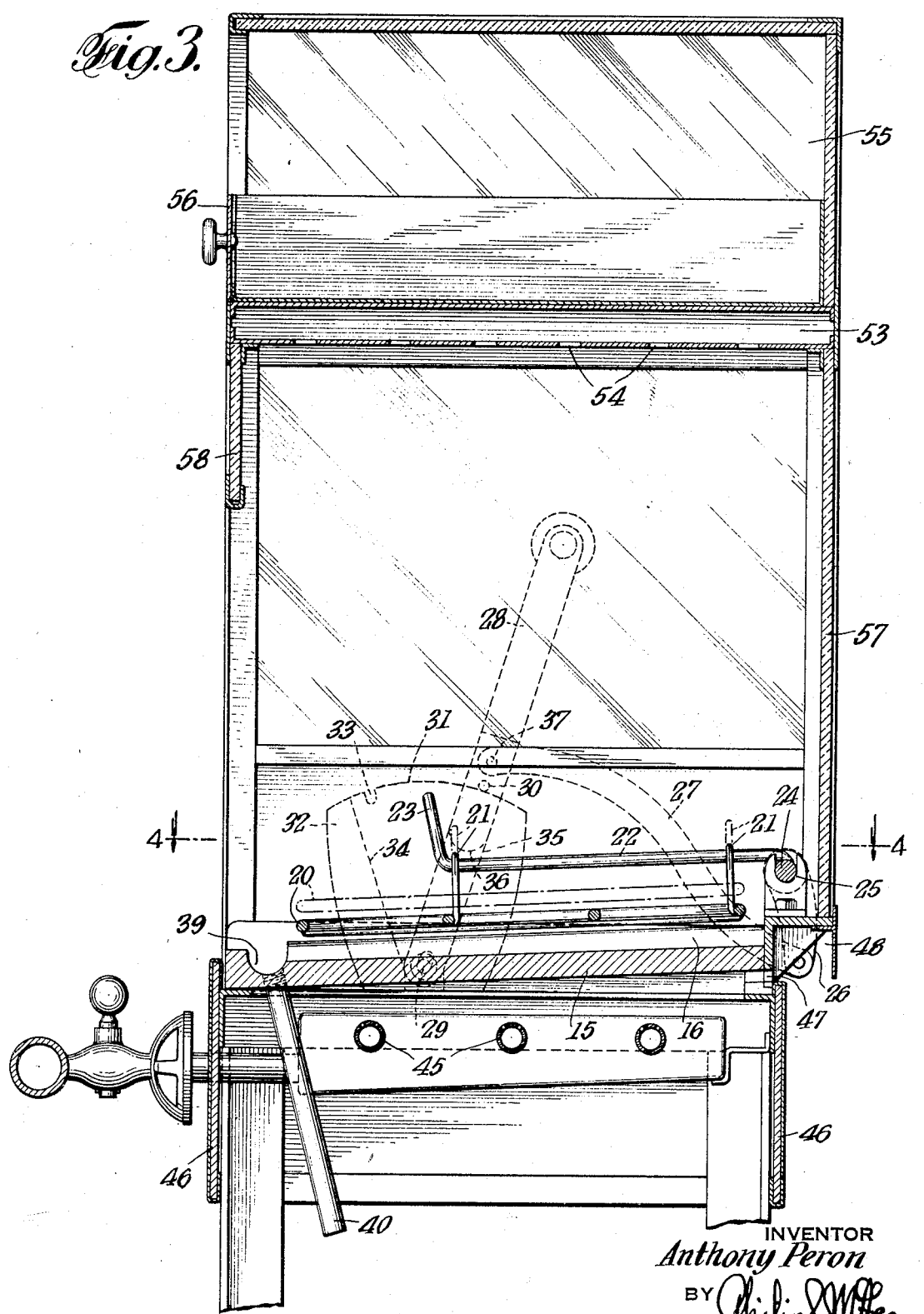
Fig. 3 is an enlarged vertical sectional view as on substantially the plane of line 3—3 of Fig. 1.

In the first form of the invention shown, the food holding grille is made self-adjusting by suspending it through the medium of loops 21 from bars 22 which as indicated in Fig. 3 permit the grille to come only so close, say a quarter of an inch to the rounded tops of the cooking ridges, so that the grille cannot press too heavily on thin material, such as slices of bacon and the like. For larger and thicker pieces, the grille may rise as indicated in the broken lines and so adjust itself to rest lightly on the food, just holding it in proper heat receptive relation to the ribs of the broiler plate.

The supporting bars 22 from which the grille is loosely hung, are shown as having upturned ends 23, preventing the grille from sliding off, but permitting the grille being easily removed by sliding it and lifting it up over such upturned ends.

Figure 12:
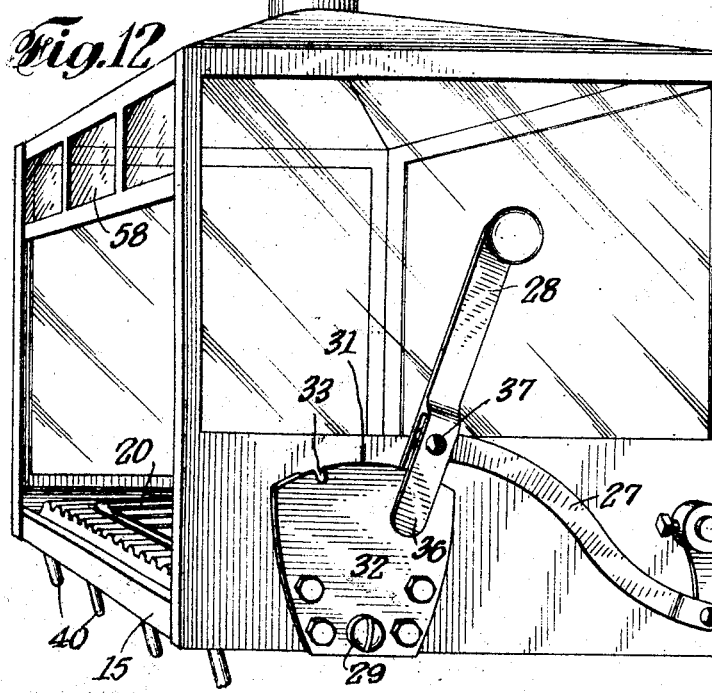
Fig. 12 is a perspective view illustrating a modification of the first form of the invention in which the hood is modified to carry off the fumes at the top instead of at the bottom, as first illustrated.
Figure 11:
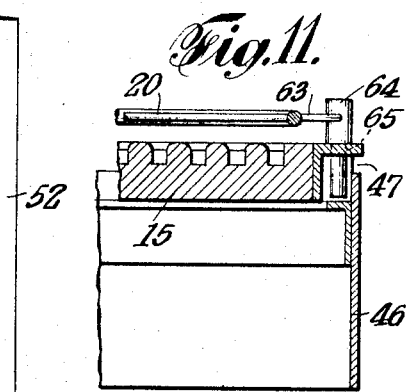
Fig. 11 is a broken sectional detail as on line 11—11 of Fig. 9.

Preferably, means are provided for readily lifting the grille. Thus in the first form, the supporting bars 22 are shown as carried by a rock shaft 24 journalled in bearings at the back of the broiler plate at 25 and carrying at one end a rocker arm 26 connected by link 27 to a hand lever 28. This lever is shown as loosely pivoted at its lower end on a pivot screw 29 and as carrying a pin 30 working over the arcuate upper edge 31 of a guard 32, the loose pivotal mounting of the lever permitting this pin to drop into a slot 33 for holding the lever in the forwardly swung position indicated in Fig. 2 with the grille lifted up clear of the grid. The guard is shown in Figs. 3 and 4 as having versely inclined stop shoulders 34, 35 for limiting the throw of the lever, the latter serving for sustaining the parts as in Fig. 3 with the supporting bars 22 spaced substantially parallel above the grid. The hand lever is indicated as having an extension 36 spaced from the face of the lever and extending down over the outer face of the guard, this construction providing a fork as indicated in Fig. 12, receiving the end of the link 27 and forming a convenient mounting for the pivot 37 of the forward end of the link.

As shown in the detail view, Fig. 5, the rounded contour of the food supporting and cooking ribs may be varied to suit the nature of the food. Thus as shown at the left in this view, the ribs may be formed with a quite flat curve to provide sufficient area for supporting and conducting a relatively great amount of heat to thicker pieces of meat and the like, or as at the right in this view, with sharper curves for lesser areas of contact with thinner pieces of meat, fowl, fish, etc. These ribs of different curvature may be alternated or graded in curvature from one end toward the opposite end, or ribs of one curvature be located at one end of a different curvature from those at the opposite end of the broiler plate, to enable a certain choice to be exercised in the cooking of different foods. In multiple unit broilers, such as illustrated in Fig. 1, the broiler plates may be different in the several units in the manner described particularly for cooking different kinds of foods.

Figure 8:
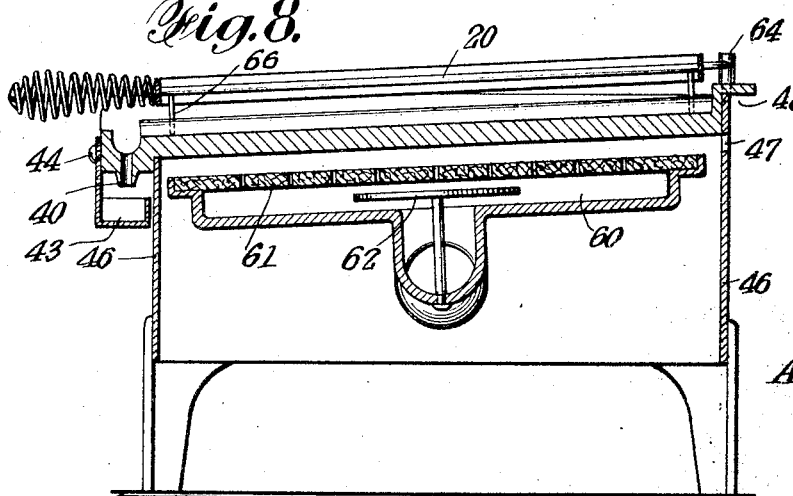
Fig. 8 is a vertical sectional view of a simplified form of the broiler designed particularly for home use.
Figure 9:
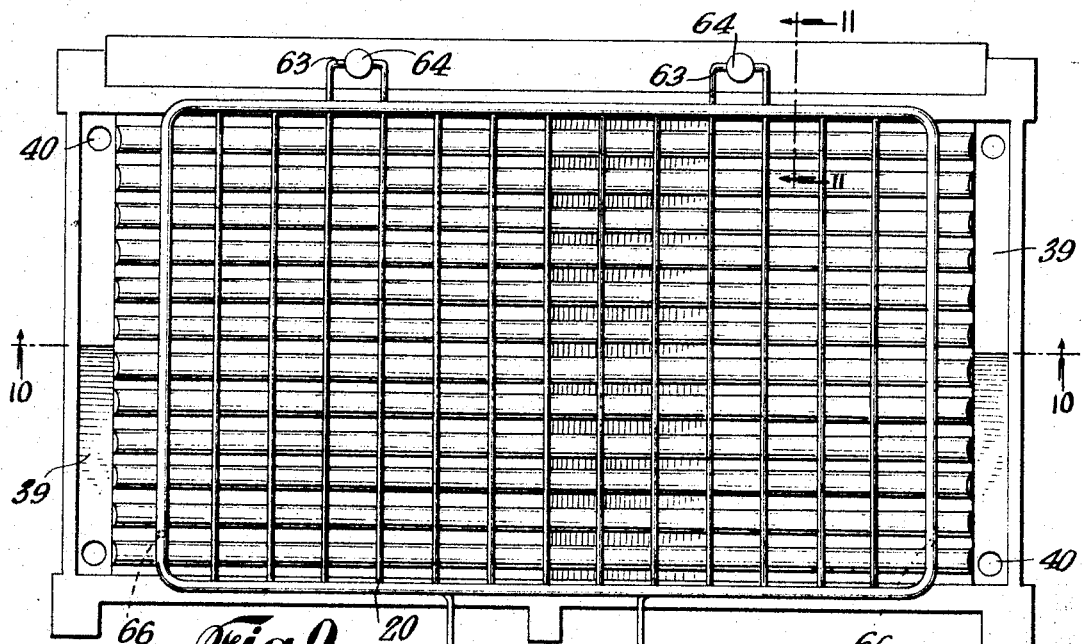
Fig. 9 is a plan view of another simple form of the broiler.
Figure 10:
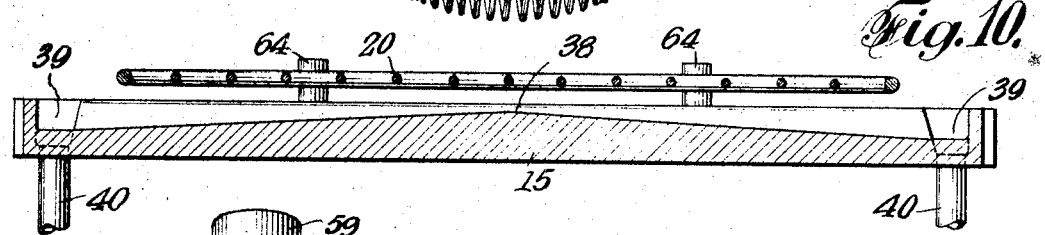
Fig. 10 is a broken sectional view of the last mentioned form as on substantially the plane of line 10—10 of Fig. 9.

The draining effect may be accomplished by inclining the broiler plate as a whole, as indicated in Figs. 3 and 8, or by inclining the grooves, after the manner illustrated in Figs. 9 and 10, where the plate is substantially horizontal and the grooves are inclined in opposite directions from an intermediate high point 38 toward collecting troughs 39 at opposite ends of the ribs. In the inclined form of structure as in Fig. 3, only a single collecting trough 39 is required, forming a gutter at the lower ends of the grooves. One or more drain pipes from the collecting trough or troughs may be provided, as indicated at 40, and the same may discharge into a suitable collecting receptacle, such as the water pans 41 in Figs. 1 and 2, supported by the under-frame 42, or the elongated pan 43, as in Fig. 8, detachably hung from the lower end of the grid as by screws 44.

Any suitable form of heat, such as coal or wood fire, oil, gas or electric burners may be utilized. As gas fuel is usually available, gas burners are indicated at 45, Fig. 3, located directly beneath the ribbed portion of the broiler plate. Aprons 46 are shown enclosing the burner structure and the rearward or righthand apron in Fig. 3 is shown as having an opening 47 above the top of the same for permitting the gases of combustion to escape from beneath the high end of the broiler plate into a channel 48 extending longitudinally of the broiler and open at the bottom and at opposite ends to permit dissipation and dispersion of waste heat and gas.

If desired and to some extent in the construction shown in Figs. 1, 2 and 3, gases of combustion and waste heat from the burner may be drawn off by the fume collector, which is shown as an exhaust blower 49 having its suction side connected by conduit 50 with down draft passes 51 built into the hood structure 52 and communicating with laterally extending chambers 53 over the broilers and open thereto through suitable perforations or ports 54.

The double-walled construction necessary to provide the lateral chambers 53 over the broiler plates may serve as the true top of the hood, but in the illustration, the hood is shown as extended above such chambered top to provide a warming chamber or oven 55 which may have mounted in it removable draws or trays 56 for keeping baked potatoes or the like.

To hold the heat over the broiler plates, the back of the hood is shown as entirely closed by a panel 57 and at the front a short panel 58 is shown which extends down far enough to assist as a collector, without interfering with the proper access to the broiler plates.

The apparatus is of a type suitable for window display in restaurants and the like and the hood panels are therefore illustrated as of glass so that the cooking operations may be observed from all sides, particularly through the back wall 57 which, in the case of use for display purposes, would be placed facing the window.

Where more convenient to draw off the smoke or cooking fumes at the top, the hood may be constructed as illustrated in Fig. 12 with a top outlet 59 which may be connected with a blower or simply led to a chimney or the like.

In a smaller size or domestic type of broiler, such as shown in Fig. 8, the burner may be constructed as a hollow pan-like casting 60 closed over by a perforated or porous burner plate 61 of asbestos or the like adapted by its radiant heat characteristics to distribute the heat more evenly over the broiler. A baffle 62 is indicated in this burner for spreading the gas over the burner plate.

In Figs. 8, 9, 10 and 11, a somewhat lighter form of grille is employed and this grille is made self-adjusting to the thickness and character of the material being cooked by pivoting it at the rear through hinge loops 63 to short posts or studs 64 having vertical sliding mounting in sockets 65. This construction also permits of the grille being readily lifted off entirely clear of the broiler for cleaning purposes and the like. To prevent contact with the grid, this form of grille is shown as having dependent pins 66 which space the grille a desired minimum distance from the grid.

Figure 6:
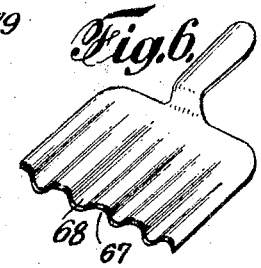
Figs. 6 and 7 are perspective views showing a "lifter" for the meat and a pronged scraper, designed for cooperation with the ribbed structure of the broiler.

For lifting the food off the grid without injuring the same, particularly the more fragile forms of food, such as fillets of fish and the like, special lifters such as illustrated in Fig. 6 may be employed, the same being in the nature of a lifting paddle, reversely and alternately corrugated on the underside at 67 and on the upper side at 68 to slide over the ribs and in the grooves between the ribs and thereby to separate the material from the ribs at all points of contact and thus fully and cleanly separate it, while lifting it.

Figure 7:
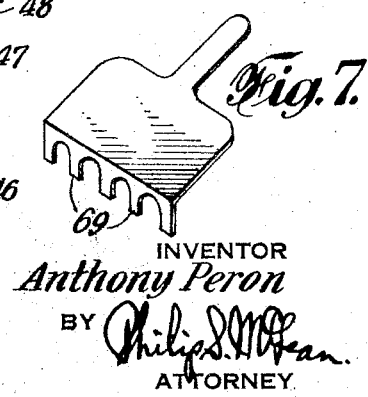

For cleaning the ribs and spaces between the ribs, a forked implement like that indicated in Fig. 7 may be provided, the same being of a general paddle form as before, but having downturned spaced fingers 69 at its forward edge contoured to closely fit over the ribs and into the grooves between the ribs to form scraping edges for simultaneously cleaning both ribs and grooves.

The grid or broiler plate may be cast of chrome-iron alloy, to provide quick heating and good thermo-conducting qualities, easy cleaning and great strength and less brittleness than ordinary cast iron. While particularly for meats and fish, various other foods may be cooked, bread may be toasted and other uses made of the invention and the best possible results are attained, particularly because of the fact that the greases, fats and impurities are drained off naturally while the cooking progresses and without squeezing out the desirable meat juices and the like.

As illustrated in the several views, the grid may be formed as a single casting having the ribs, grooves and drainage gutter or gutters formed as integral parts of the same, the ribbed portion being imperforate to prevent the burner products from reaching the food and this one-piece casting may be used as the base for supporting the rock shaft and the operating means for the grille including the hand lever and the holding quadrant or guard for the same. This assembly may then be utilized in effect as a base over which the hood may be applied. The lifting and cleaning paddles may be constructed of thin but stiff sheet metal and the first of these be formed with its corrugated forward edge beveled or sharpened to readily enter between the ribs and the food to cut the food clear without tearing or breaking it. Two such lifting tools may be employed for turning meats and the like, the second being placed over the top of the meat in reversed order, so that it may be lowered over the ribs to replace the meat on the opposite side, after the meat has been turned over, held between the two paddles.

The double-walled top, receiving heat directly from the cooking space above the grid, constitutes the bottom of the false top which forms the warming oven and hence provides an efficient means for keeping warm "hot foods", the trays resting directly on this bottom of the warming oven.

What is claimed is:

1. Cooking apparatus of the character disclosed, comprising in combination, an imperforate grid having closely spaced upstanding ribs with rounded upper edges and drainage grooves between said ribs, an open-work grille, means for mounting said grille in self-adjusting relation over the grid movable toward and away from the ribs to meet different thicknesses of material on the ribs, including stop mechanism for preventing approach of the grille beyond a predetermined minimum space from the ribs, a swinging handle connected by linkage with the grille and a guard with which said handle has interlocking engagement to limit the movement of and retain the same in desired positions of the grille.

2. Cooking apparatus of the character disclosed, comprising in combination, an imperforate grid having closely spaced upstanding ribs with rounded upper edges and drain grooves between said ribs, an open-work grille, means for positioning said grille in readily removable self-adjusting relation over the grid, a burner beneath the imperforate ribbed portion of the grid, the grille positioning means including a rock shaft carrying projecting arms having upturned ends and the grille having loops loosely and removably engaged over the arms in back of said upturned ends.

3. Cooking apparatus of the character disclosed, comprising in combination, an imperforate grid having closely spaced upstanding ribs with rounded upper edges and drain grooves between said ribs, an open-work grille, means for positioning said grille in readily removable self-adjusting relation over the grid, a burner beneath the imperforate ribbed portion of the grid, the grille positioning means including a rock shaft carrying projecting arms having upturned ends and the grille having loops loosely and removably engaged over the arms in back of said upturned ends, a hand lever connected with said rock shaft and means for releasably holding said hand lever with the rock shaft rotated to a position holding the grille upraised over the grid.

4. Cooking apparatus of the character disclosed, comprising in combination, an imperforate grid having closely spaced upstanding ribs with rounded upper edges and drain grooves between said ribs, an open-work grille, means for positioning said grille in readily removable self-adjusting relation over the grid, a burner beneath the imperforate ribbed portion of the grid, the grille positioning means including a rock shaft carrying projecting arms having upturned ends and the grille having loops loosely and removably engaged over the arms in back of said upturned ends, a hand lever connected with said rock shaft, means for releasably holding said hand lever with the rock shaft rotated to a position holding the grille upraised over the grid, the grid carrying bearings for said rock shaft and provided also with means for mounting the hand lever and the securing means for the latter.

5. A broiler, comprising in combination, an inclined imperforate grid having closely spaced upstanding ribs, inclined from the higher toward the lower end of the grid, a rock shaft journalled at the upper end of the grid, a rocker arm carried by said shaft, a handle connected to turn said shaft from a position with said rocker arm overstanding the grid to an upstanding position clear of the grid and an open-work grille having loops loosely engaged over said rocker arm and whereby in the lowered position said grille may approach the grid to a limited extent and may by engagement with material on the grid adjust itself to hold said material in position on the slanting ribs.

6. A broiler comprising a solid grid having closely spaced upstanding ribs, an open work grille overstanding said grid for holding material on the ribs, pivoting means for said grille located at one edge of the grid, lost motion supporting means for the grille enabling said grille to have self-compensating bodily adjustment over the grid for engagement of the grille with different thicknesses of material on the grid aside from the swinging pivotal movements of the grille, said lost motion supporting means furthermore being detachable to enable ready separation of the grille from the grid and handle means for raising the grille and for lowering the same into self-adjusting engagement with material on the grid.

ANTHONY PERON.